(12) United States Patent
Capps et al.

(10) Patent No.: US 8,180,463 B2
(45) Date of Patent: May 15, 2012

(54) METHOD AND APPARATUS FOR A COMPUTERIZED INTEGRATED POWER BUS

(75) Inventors: Rick W. Capps, Fernley, NV (US); Stephen V. Diebel, Sparks, NV (US); John A. Ridyard, Fallon, NV (US)

(73) Assignee: Nevada Automotive Development Center, Carson City, NV (US)

( * ) Notice: Subject to any disclaimer, the term of this patent is extended or adjusted under 35 U.S.C. 154(b) by 1955 days.

(21) Appl. No.: 10/382,200

(22) Filed: Mar. 4, 2003

(65) Prior Publication Data

US 2003/0171828 A1 Sep. 11, 2003

Related U.S. Application Data

(60) Provisional application No. 60/362,128, filed on Mar. 5, 2002.

(51) Int. Cl.
*G05B 11/01* (2006.01)
*G05D 17/00* (2006.01)
*G06F 7/00* (2006.01)
*H04Q 1/30* (2006.01)

(52) U.S. Cl. .......... 700/22; 700/286; 700/292; 340/531; 701/1; 701/36

(58) Field of Classification Search ............... 700/1, 22, 700/286, 292, 293; 701/1, 36; 340/531
See application file for complete search history.

(56) References Cited

U.S. PATENT DOCUMENTS

| | | | |
|---|---|---|---|
| 4,942,571 A | 7/1990 | Moller et al. | 370/85.1 |
| 5,508,689 A | 4/1996 | Rado et al. | 340/825.06 |
| 5,592,485 A | 1/1997 | Consiglieri et al. | 340/825 |
| 5,670,845 A | 9/1997 | Grant et al. | 315/77 |
| 6,107,221 A * | 8/2000 | Nakajima et al. | 442/401 |
| 6,421,593 B1 * | 7/2002 | Kempen et al. | 701/48 |
| 6,513,368 B2 * | 2/2003 | Bondarowicz et al. | 73/53.05 |
| 6,573,675 B2 * | 6/2003 | Schmitz et al. | 318/434 |
| 6,671,594 B2 * | 12/2003 | Miller | 701/33 |
| 6,728,603 B2 * | 4/2004 | Pruzan et al. | 701/1 |
| 6,757,597 B2 * | 6/2004 | Yakes et al. | 701/22 |
| 6,799,814 B2 * | 10/2004 | Lesesky et al. | 303/122.02 |
| 6,879,895 B2 * | 4/2005 | Capps et al. | 701/36 |
| 7,693,628 B2 * | 4/2010 | Fuhrman et al. | 701/36 |
| 7,890,227 B2 * | 2/2011 | Sayama et al. | 701/29 |
| 2001/0016789 A1 * | 8/2001 | Staiger | 701/1 |
| 2004/0002794 A1 * | 1/2004 | Pillar et al. | 701/1 |
| 2005/0177281 A1 * | 8/2005 | Caves et al. | 700/276 |
| 2009/0143922 A1 * | 6/2009 | Juricak et al. | 701/1 |

* cited by examiner

*Primary Examiner* — Ramesh Patel
*Assistant Examiner* — Jennifer L Norton
(74) *Attorney, Agent, or Firm* — Dean A. Craine (57) ABSTRACT

An electrical management control and monitoring device that easily interfaces with an existing motor vehicle electrical system that includes both "dumb" and "smart" circuits to protect the electrical system during events in which the voltage, current or temperature may change and potentially cause damage or render the vehicle electrically "dead". The device, which is coupled to the motor vehicle's ignition switch, power source and multiplex bus, includes a motherboard, a microcontroller and software program that monitors the vehicle's capacitor, battery or combination voltage, current and temperature and automatically disconnects non-critical circuits when their values become extreme or reach a preprogrammed threshold. The motherboard includes output connectors that are coupled to solid-state relays that act as a supplemental power source to provide electrical power to components that require electrical power after the ignition has been turned off. The software program is used to prioritizes electrical power distribution to the components which are critical to engine starting, power train control and general longitudinal and lateral control systems of the vehicle.

5 Claims, 6 Drawing Sheets

METHOD AND APPARATUS FOR A COMPUTERIZED INTEGRATED POWER BUS

This application claims the filing date of the provisional patent application, Ser. No. 60/362,128 filed Mar. 5, 2002.

BACKGROUND OF THE INVENTION

1. Field of the Invention

The present invention relates to the field of computerized electrical buses that connect and integrate a vehicle's electrical power supply. In particular, the invention applies to those vehicles computerized electrical buses which connect and integrate with a wide variety of different electrical and electronic systems that utilize different and often incompatible operating standards and wire harnesses.

2. Description of the Related Art

In the first manifestation of the internal combustion powered vehicles, such as the automobile, train, airplane, submarine and the like, electricity played an important part in that vehicles functioning. First, electricity was generated to provide the spark that was needed to start or run the internal combustion engine that powered the movement of the vehicle. Later, electricity was used for powering the various auxiliary electrical devices associated with the vehicle, such as lights, gauges, radio and the like.

During the latter portion of the twenty-century, many vehicular electrical devices were developed to be controlled by a computer chip. This allowed electrical devices to accommodate high speed processing of large amounts of information or data. This increase in data handling allowed electronic devices for motor vehicles to become very sophisticated. Such devices include: ABS (automatic brake system); fuel injection/turbo-super charged engines; electrically operated automatic transmissions; airbag systems; automatic interior environmental control; pollution control equipment; and other types of non mechanical/operate-by-wire instrumentalities.

As a result of this "smart" evolution, there now can be found in almost every vehicle a wide variety of electronic and electrical devices/systems that are generally incompatible to one another due to the different operating standards that arose when the systems were created at different times to handle the different needs. For example, a passenger motor vehicle has at least three different, stand-alone electrical systems. Two of these electrical systems are "dumb" systems, in that they lack computer chip control. One such "dumb" system is a digital signal-based electrical system and the other "dumb" system is the analog signal-based electrical system.

A digital signal-based electrical system is simply an "on-off" signal that is communicated by the presence, or lack thereof, of an electrical current or charge in the system. Such digital signals are generated by car door switches indicating when a car door is open or closed or by simple light switches turning one or off corresponding lights.

The other "dumb" electrical system is analog signal based. The analog system, utilizes an electrical charge or current wherein the analog signal is seen as change in voltage of the electrical charge rather than whether or not the current or charge is present or not. In this manner, the analog signal is used to communicate varying degrees of change as noted by an electrical sensor. For example, a vehicle whose engine powered by an Internal Combustion Engine (ICE) has a fuel tank containing a float driven fuel level sensor in it. When the vehicle is running, the ICE consumes fuel, and the level of fuel in the tank corresponding drops. As the float of the fuel level sensor drops with the fuel in the tank, the fuel level sensor will change the amount of electrical current (e.g. change the voltage) that it is sending to the fuel gauge on the vehicle's instrument panel. The fuel gauge then reads the amount of electricity (the analog electrical signal) coming from the fuel tank sensor and converts that signal into a reading displayed on the fuel gauge.

The conversion of the analog electrical signal, as it relates to the displayed information of the fuel gauge, is shown as follows: no electrical charge from the fuel level sensor=empty gas tank reading; small electrical charge from sensor=¼ gas tank reading; greater electrical charge from sensor=½ gas tank reading, etc. Other types of analog signal-based electrical devices include engine temperature gauges and sensors (i.e., cold, warm, very warm, hot, too hot).

These analog and digital based electrical signals, when transmitted between electrical devices in a vehicle, have been traditionally carried by a cumbersome multiple-wire harness. Generally speaking, for each gauge, sensor and other "dumb" electrical device uses separate and distinct sets and/or other devices. Each set of wires has at least one (1) wire that supplies electricity to the device and at least one (1) wire that delivers electricity away from the device to another device or to the ground. A vehicle having multiple electrical devices, which are based either on analog and digital signals, will have a wire harness that has a multitude sets of wires. Such wire harnesses, due to their complexity in having a large number of wire sets, are cumbersome to deal with as well as difficult to build, install, maintain and repair. This very complexity can result in electrical systems of some vehicles to become very unreliable, leading to serious electrical problems, as in some instances of causing vehicle fires.

With the rise of the use of computerized vehicular equipment, yet another electrical system with its own wire harness has adding to situation to make it very unwieldy. All of these electrical systems, the wire harness of the computer-controlled or "smart" automotive electrical devices is the simplest since the harness is a simple single wire pair system.

An example of such a system is known as the SAE (Society of Automotive Engineering) J1939 or CAN system (CAN 2.0B) that is used in military and commercial vehicles. The J1939 single wire pair harness system uses a differential voltage current to transmit/receive serial stream messages or signals between the "smart" electronic devices.

These serial signals have bits of information or data that are encoded or "compartmentalized" into different segments of the signal itself. In this manner, for example, the first part of the serial stream signal contains an identifier information telling the recipient device that incoming signal is to be received for it alone. The second part of the signal contains data as to what specific action the recipient device should take. A third part section of the signal may contain data that the recipient device uses to underact a requested action.

Thus, by using a serial stream signal, a significant amount of information could be processed by "smart" electronic devices to handle increasingly sophisticated and complex tasks. The performance of devices and systems of vehicles would be enhanced to allow replacement of mechanical-based vehicle control with wire-based control.

An example of this development is the ABS or Automatic Braking System on motor vehicles. The ABS control-by-wire utilizes several sensors in the vehicle to send a continuous stream of a large amount of data to computerized controller of the ABS. This almost instantaneous processing of large mounts of data allows the ABS to act faster in braking the vehicle to driving conditions, without locking the brakes, than could the driver while utilizing the old mechanical direct operation of the brakes in a non-ABS brake system.

Another benefit of the "smart" wire harness in using a differential voltage to transmit its serial stream signals this helps to screen out or overpowers any potential electrical radiation or noise occurring in the "smart" wire harness. Current drawbacks to this "smart" system are that "dumb" devices can not utilize serial stream messages. Further, even if the "dumb" devices where connected into a "smart" wire harness, the "dumb" devices would interfere with the differential voltage used on the "smart" harness so as to cause a failure or shutdown of the "smart" system.

As such, many motor vehicles have a "smart" wire harness (e.g. J1939) separate from the standard "dumb" multiple wire harness, to allow the motor vehicle to have "smart"-type electronic devices in addition to the standard "dumb" electrical devices. Although the general trend of the vehicle manufactures is going toward full utilization of "smart" systems, it will be some time before that goal is fully realized. When that time does come, the potential for vehicles to reach a total drive-by-wire control, similar to their airborne brethren's fly-by-wire capacity will become a reality.

For example, it is possible that all future vehicular analog/digital electrical devices will have a "gateway" type chip in them that will allow the "dumb" electrical/electronic device/system to receive, transmit and process serial stream messages from the "smart" wire harness's computer control center, thus affording the "dumb" devices/systems to have full compatibility with "smart" devices. This full integrated control will allow for "smart" computer control of analog/digital devices.

An example of this would be the control of the motor vehicle's headlights. In addition to the switching on and off of the headlights, a vehicle's computer could automatically vary the intensity of a single headlight to correspond to the lighting conditions on that headlight's side of the road.

Until that time occurs when the manufacturing industry has established and adopted a uniform set of standards that permit full "smart" capability, the vehicle manufacturers and their suppliers will continue to make vehicles which have separate "smart" and "dumb" electrical systems running side-by-side. The current situation is analogous to having a computer network running along side a communication technology that utilizes pair of tin cans connected by string. Further, a vehicle which does not have full integration of the its electrical systems cannot take advantage of the multiple benefits of the "smart" computerized electrical system. There is also associated with this non-integration, a price of increased cost for the vehicle's overall electrical system which has to have at least duplicate costs for manufacture, installation, and maintenance/repair as well as having a wire harness that is cumbersome, complex and heavy.

Outside of the above discussed concerns, here is also a need for a comprehensive computerized vehicle electrical system that can handle a wide variety of electrical systems that accompany a wide variety of powertrains/propulsion units. This can include augmentation or replacement of standard vehicle battery with fuel cells, capacitors and other energy storage devices.

As worldwide concern about emission pollution continues to grow, governments worldwide are imposing greater restrictions and stricter mandates on the amount of pollutants that an internal combustion power plant can emit. As such, to meet these ever-increasing restrictions and mandates, the vehicle manufactures are turning towards other means of propulsion to supplement or even supplant the dated internal combustion engine. Such replacement includes the utilization of solar power, electrical energy stored by very powerful capacitors, hydrogen-powered fuel cells, wireless energy transmitting grid (e.g. microwave) and other futuristic propulsion systems. With such new and hybrid power systems, will come electrical systems that have standards that are different from the current vehicular electrical systems and will add to the already confusing state of affairs of electrical system integration.

There is therefore, a current and future need for an overall vehicular electrical system that highly adaptable in that it can integrate the current and future amalgam of electrical/electronic devices and corresponding systems of existing and future vehicle into one simplified and unified electrical systems.

SUMMARY OF THE INVENTION

It is an object of the present invention to provide a simple and inexpensive power bus that replaces or connects to an existing wire harness that provides centralized control of both "dumb" (digital and analog-) and "smart" electronic/electrical devices (e.g., SAE J1939-) in the vehicle.

It is another object of the present invention to provide such a device that can be integrated with both analog and digital electrical and electronic devices and systems used in the vehicle.

It is another object of the invention to provide such a device that has a self-diagnostic mode which monitors the vehicle's components and systems and provides status information thereto.

It is a further object of the invention to provide such as device that acts as a network node that enables old vehicle system's to be upgraded to J1939 standards.

These and other objects are met by the intelligent electrical management control and monitoring power bus device disclosed herein designed to easily interface with an existing motor vehicle electrical system. The intelligent node, hereinafter called the device, includes both "dumb" and "smart" circuits to protect the vehicle's electrical system during events in which the voltage, current or temperature may change and potentially cause damage or render the vehicle electrically "dead". The device is coupled to the motor vehicle's ignition switch, power supply and multiplex bus. The device includes a plurality of output connectors each coupled to a solid-state relay that act as a power source to the vehicle's components and circuits that require electrical power to operate. The device comprises of a standard motherboard mounted inside a protective box. Mounted on the motherboard is a power supply input connector that connects to the vehicle's power source. Also mounted on the motherboard are load lead output connectors and digital and analog connectors that connect to various digital, analog and electronic ("smart") components. In the preferred embodiment, the connectors for the electronic devices are based on the SAE J1939 standard (i.e., commercial and military vehicles). The motherboard also includes a Controller Area Network (CAN) controller thereby enabling it to serve a CAN network to handle the transmission, receipt, processing of serial stream signals.

In the preferred embodiment the load control output includes eight solid state switch relays that direct the electrical power from the power port to the output connectors. In addition to controlling electric power to various electrical/electronic devices and systems of the vehicle, the microcontroller and a proprietary software program disclosed herein is able to process "dumb" and "smart" signals from various electrical/electronic devices and systems on the vehicle. More particularly, the motherboard includes circuitry that reduces the voltage and amperage of the "dumb" signals to prevent the circuitry inside the microcontroller from being burnt out and then converts the "dumb" digital/analog into a digital signal that can be processed by the microcontroller. Similarly the "smart" signal or serial stream signals are received by the motherboard and converted into signals that can be processed by the microcontroller.

When the microcontroller has processed the incoming data, it issues new signals, called smart signals, to the "smart" type of display or other suitable diagnostic component to inform the vehicle operator or others (such as maintenance personnel) as to the operational condition of the vehicle via the multiplex bus. The microcontroller also issues smart signals to "smart" devices and systems in the vehicle for their regulation and control. The absence of a "smart" display does not affect the device adversely as the device is programmed to transmit signals of interest in a "talk" mode, thus the network will receive the data, and act appropriately whether or not a "smart" display is installed.

DESCRIPTION OF THE PREFERRED EMBODIMENT(S)

The device 1, which is also called a power bus or a "solid state logic controller", takes the current amalgam of vehicular "dumb" (analog and digital) electrical systems and the "smart" (e.g., J1939) systems and a computerized (and simplified) wire harness and integrates them under a single unified intelligent control. In this manner, the device 1 operates as a network node to control both smart and dumb electrical/electronic devices and systems of the vehicle.

Figure 1:
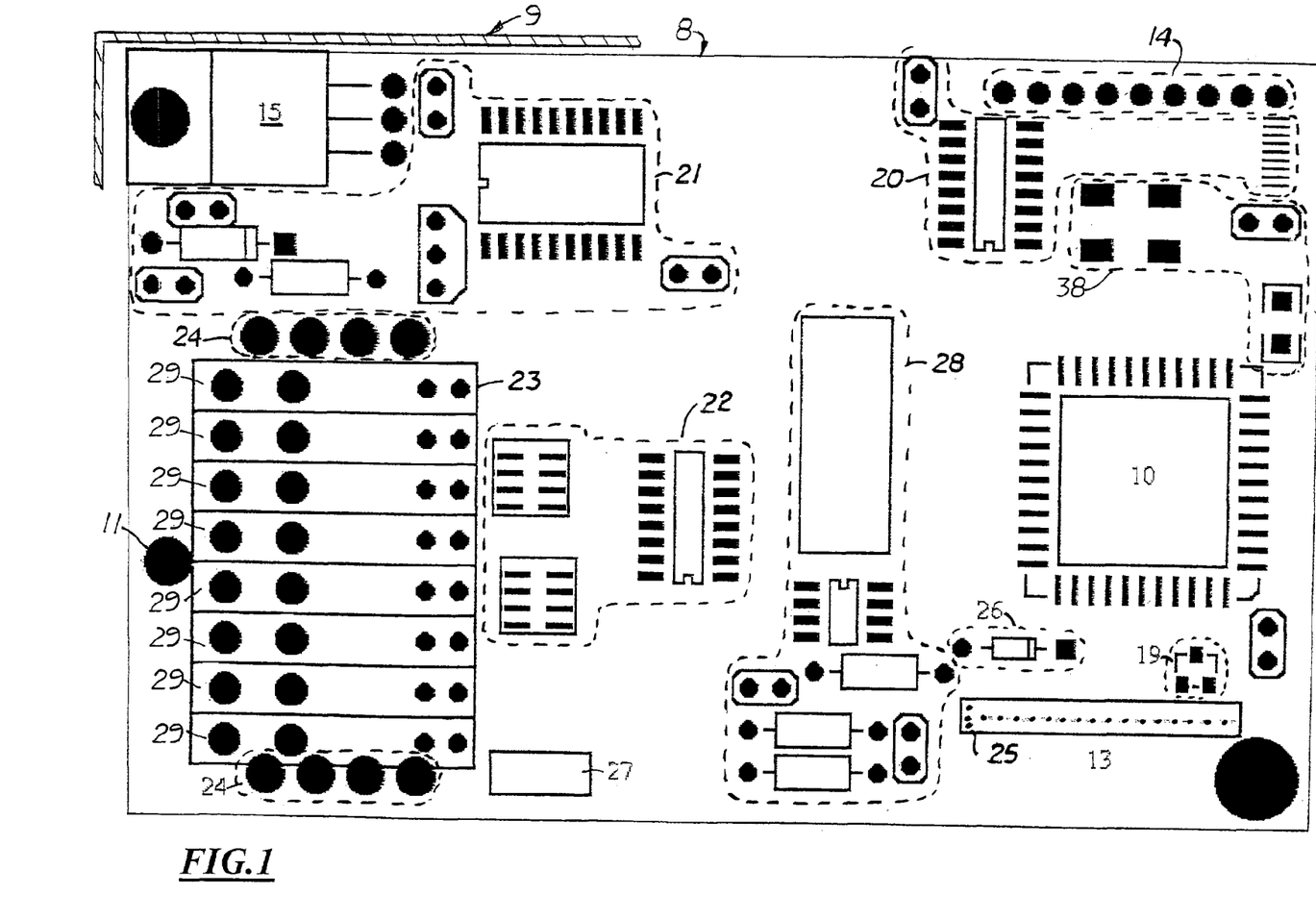
FIG. 1 is a block schematic of the circuitry of the power bus device disclosed herein.
Figure 2:
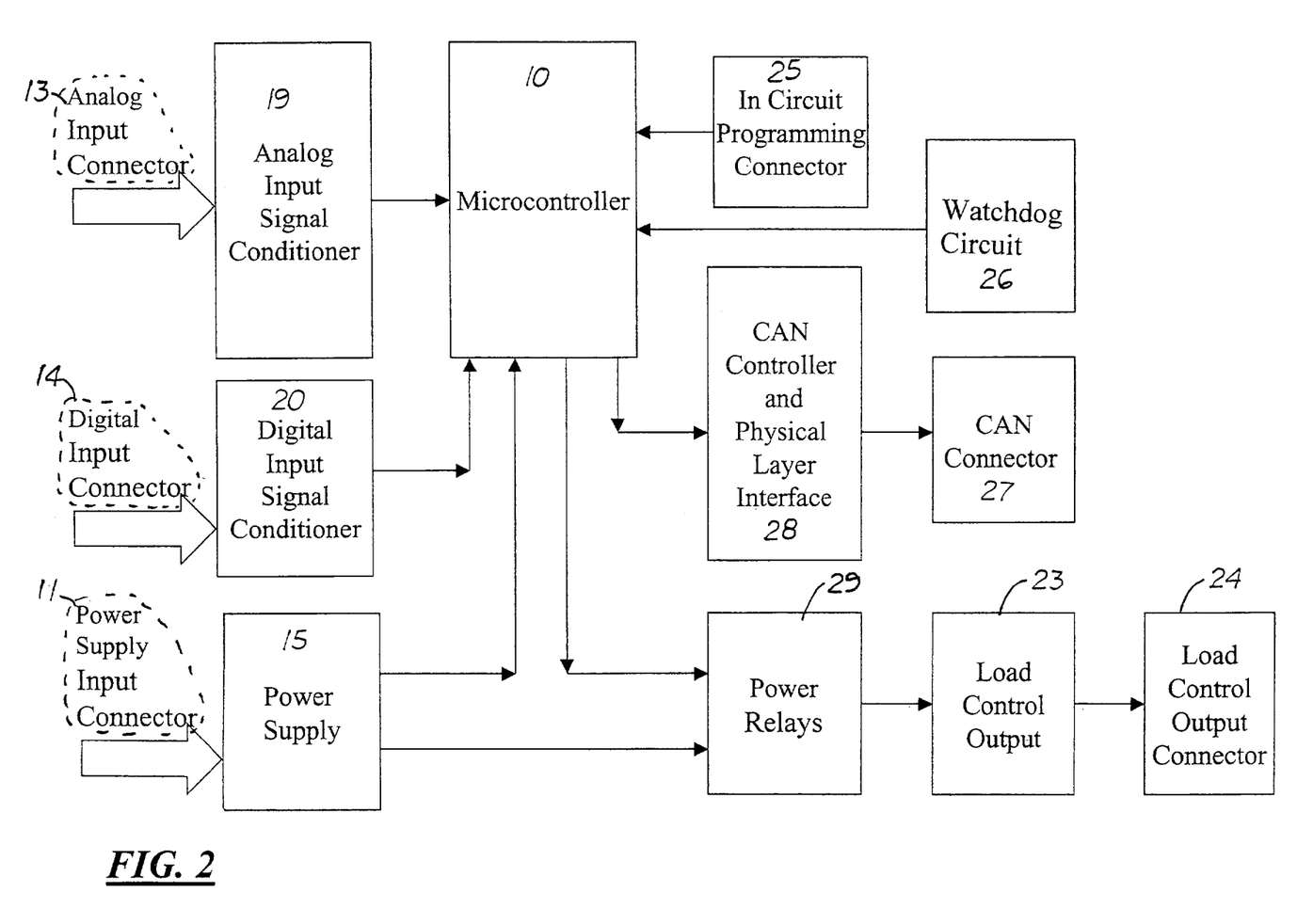
FIG. 2 is a detailed block schematic of the circuitry of the device.

As shown in FIG. 1, the device 1 includes a microcontroller 10 mounted on a motherboard. In the preferred embodiment, the microcontroller is a 16F877 made by Microchip, Inc. located in Chandler, Arizona, and mounted on a standard motherboard 8. The device 1 has one input connector 11 and several output (electrical load) connectors 24 that are connected to the microcontroller 10. In the preferred embodiment, microcontroller 10 is connected to several (up to 16 in the preferred embodiment) analog connectors 13 and several (up to 8 in the preferred embodiment) digital connectors 14 to link with the standard "dumb" multiple wire set harness in the vehicle. For connection of the device 1 to all the "smart" devices (including the "smart" display panel on the vehicle), a "smart" or CAN connector 27 (in the preferred embodiment a SAE J1939 [CAN] hookup) is used to link the device 1 to a "smart" single wire pair harness (in the preferred embodiment SAE J1939 [CAN]).

The motherboard 8 hosts all the electronic/electrical hardware used by the device 1. The motherboard 8 is contained within a standard shockproof aluminum diecast housing 9 with the various connectors and leads being present on the outside of the housing 9. Mounted on the motherboard 8 is an analog connector 13, a digital connector 14, power supply input connector 15, a digital input signal conditioner 20, a power supply and voltage reference 21, a load control logic 22, a load control output 23, a circuit programming connector 25, a watchdog circuit 26, a CAN connector 27, a physical layer interface 28, and a crystal oscillator 38.

The analog input connectors 13 are connected to the analog input signal conditioner 19 which reduces the voltage and amperage of the analog signals and converts those signals into the format that microcontroller 10 can understand. The digital input signal conditioner 20 does the same thing for the digital signals being bought by the digital input connector 14. Both the analog signal conditioner 19 and the digital input signal conditioner 20 are connected to the microcontroller 10 for transmitting the converted "dumb" signals to the microcontroller 10.

The input connector 11 is connected to the power supply 21 which varies the amperage and voltage of the electrical power supplied by the input connector 11 to supply the microcontroller 10 and the load control logic 22 with the appropriate amounts of electrical power. The microcontroller 10 is also connected to the load control logic 22. During operation, the microcontroller 10 issues a command(s) to the load control logic 22 to operate the load control output 23. The load control logic 22 then handles the actual operational control of the load control output 23. The semi-autonomous nature of the load control logic 22 allows the microcontroller 10 to devote more of its capacity to processing input/output signals that would otherwise be used in directing the controls the load control output 23. The load control logic 22 also controls the solid state switch relays 29 used in the load control output 23 and hence directs the electrical power supply to the various electrical/electronic devices/systems of the vehicle.

The above described device allows the microcontroller 10 to give simple basic commands to the semi-autonomous load control logic 22 which is then tasked to handle all the necessary steps needed to actually control the load control output 23 and hence electrical power regulation of the various electrical/electronic devices/systems of the vehicle through solid state switch relays 29. This allows the microcontroller 10 to allot a greater portion of its limited computing and memory capacity to other matters such as processing input/output signals such as serial stream messages.

The solid state switching relays 29 are connected to two load control output connectors 24 to route the electrical power though the "dumb" wiring harness to various electrical/electronic devices/systems of the vehicle.

The circuit programming connector 25 is also connected to the microcontroller 10, that allows the operator to set the various parameters or thresholds upon which the device 1 will react. Normally, the in circuit programming connector 25 is activated only when the vehicle is powered down (turned-off) but the device 1 is still receiving electrical power.

In the preferred embodiment, a watchdog circuit 26 is connected to the microcontroller 10 to monitor its activity and hence the running of the software program discussed of the device 1. If the watchdog circuit 26 senses that the software program has frozen, it will cause the software program to reinitiate or "reboot". The watchdog circuit 26 accomplishes this monitoring by regularly sending a signal to the microcontroller 10. If the microcontroller 10 does not respond within a set period of time, the watchdog circuit 26 instructs the software program to be rebooted.

As the CAN connector 27 receives and transmits serial stream messages between the motherboard, the "smart" devices and systems connected to the "smart" wire harness, the CAN controller 27 and physical layer interface 28 together convert the serial stream messages to and from a signal format which the microcontroller 10 can process.

Figure 3:
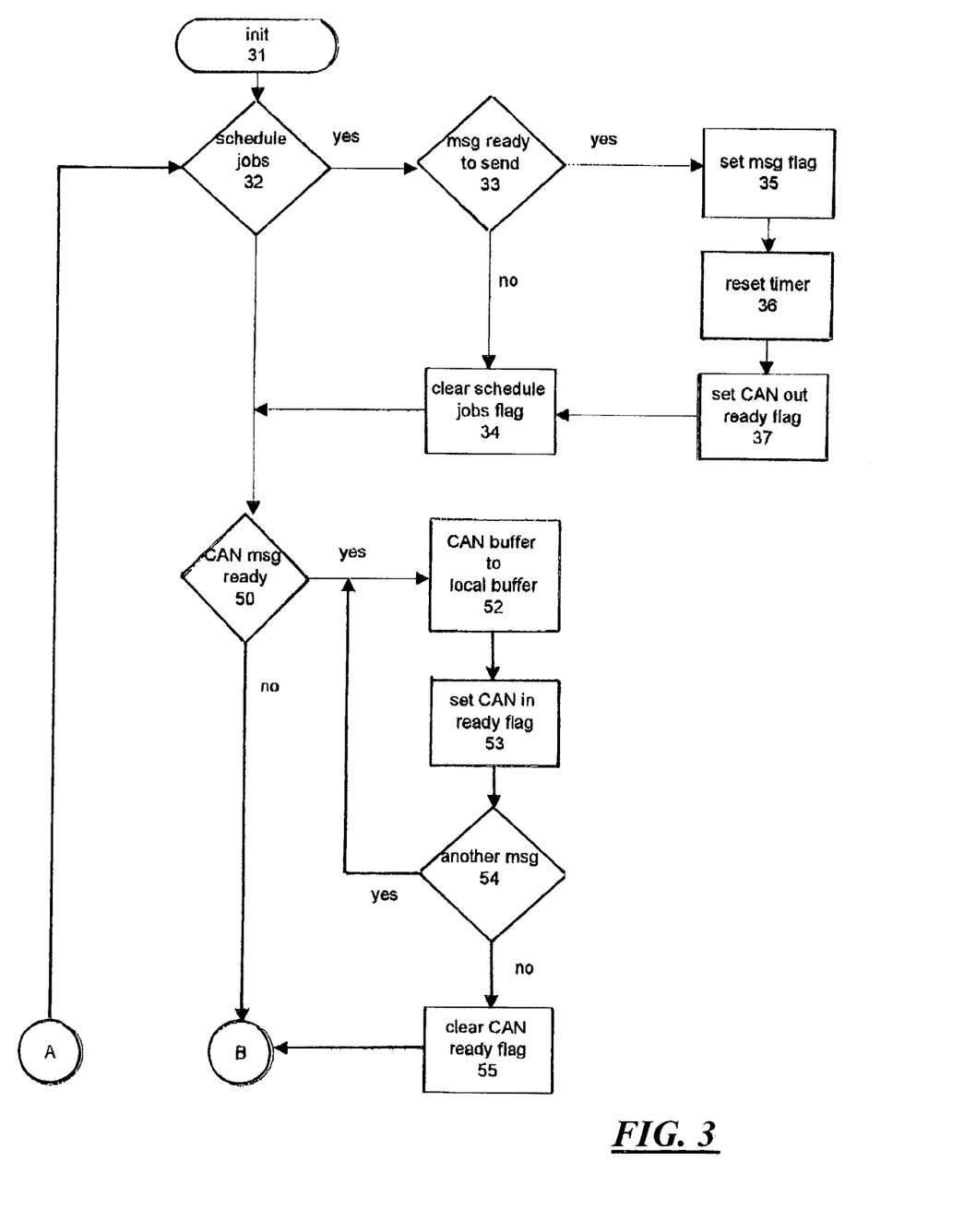
FIG. 3 is a flow diagram of the software program used with the device.

FIG. 3 is a flow diagram of the compact software program used with the device 1. The program is relatively small and compact so as to be able to be stored in within the limited memory capacity of the microcontroller 10 and work within in the chip's limited capacity. The software program has six basic logic subroutines or subroutines stringed together in one big subroutine or routine.

The first subroutine 30, is a standard housekeeping subroutine which is responsible for clearing out memory on startup of the vehicle, getting various data signal for automotive start-up priority and ready for transmission). This first subroutine 30 then connects to a second subroutine 50, also called a CAN controller communication subroutine.

The second subroutine 50 is where the signals from the microcontroller 10 are converted back and forth from/to J1939 (or CAN) serial stream messages. The second subroutine 50 is connected to a third subroutine 70, also called a J1939/CAN messages inbox subroutine.

This third subroutine 70 is where the device 1 receives incoming J1939 signals (i.e., serial stream messages) from the vehicle's "smart" electronics located on the "smart" wire harness. The third subroutine is then connected a fourth routine 90 also called a CAN output messages subroutine.

The fourth subroutine 90 sends out on the "smart" wire harness the serial stream messages from the microcontroller 10 as prioritized by the first or housekeeping subroutine 30. The fourth subroutine 90 is then connected to the fifth subroutine 110 also called a load output subroutine 110.

The fifth subroutine 110 is where the microcontroller 10 issues those signals to the load control logic 22. The load control logic 22 in turn controls the load control output 23 that opens or closes the solid state switch relays controlling the electrical power for the powering up or shutting down of the vehicle's various electrical subsystems in the vehicle. This fifth subroutine 110 in turn is connected to a sixth and final subroutine called the output/input verification subroutine 130.

The sixth or final subroutine 130 is the output/input verification subroutine that is a self-diagnostic subroutine that ensures that everything that has signaled by previous subroutines regarding their powering have been turned on/off. This sixth subroutine 130 also performs diagnostics of sensors and digital inputs and prepares this data for subsequent transmission in subroutine 50 (performed after subroutine 30). This final subroutine 130 then connects back to the first "housekeeping" subroutine 30. This action of connection between the six subroutines acts as one big routine is used to reset the first subroutine 30 and hence the software program for the next round of outgoing and incoming messages/signals for both "smart" and "dumb" electrical/electronic devices and systems of the vehicle.

The first subroutine 30 starts with an initiation ("start-up") sequence 31 which occurs when the device 1 is activated by the vehicle operator by turning on electrical power to the vehicle. At that point, the software is retrieved from memory of the microcontroller 10 and is activated.

In the preferred embodiment of the device 1, during the initiation sequence 31, the software program checks to see if there have been any watchdog hits placed in the memory of the microcontroller 10 caused when the watchdog circuit 26 rebooted the program when it previously froze. A watchdog hit is a code or number that the watchdog circuit inserted into a specific page of the microcontroller's memory when the microcontroller failed to respond (indicating the software program froze) to a signal regularly sent by the watchdog circuit. The software program upon discovering the watchdog hit, can notify the vehicle operator of the fault in the system and take other corrective action as needed.

In the initiation sequence 31, the program makes a schedule jobs decision 32 in which it decides what tasks are to be sent out to the vehicle's CAN and digital/analog electrical systems. During start-up of the vehicle, there normally will be outgoing CAN jobs/messages/commands which activate or deactivate the vehicle's CAN (J1939) electrical devices that are controlled by the device 1 through CAN (controller area network). If there are CAN tasks to be sent over the CAN network, the program reads a signal or flag (in the present case, the "schedule jobs" flag) enters the first subroutine or housekeeping subroutine 30 of the program. This first subroutine indicates to other subroutines of the program that there are CAN messages to be sent out by the invention 1. If there are no CAN type tasks and corresponding CAN messages to be sent out, then the software program of the invention 1 proceeds to activates the second or CAN controller communication subroutine 40 of the program.

If there are CAN messages and the like to be sent out by the microcontroller 10, then program runs through from the first subroutine to the "message ready to send" decision 33. At that decision, the software program determines whether or not there are CAN messages ready to be sent out over the CAN network to carry out the software program's selected and scheduled CAN tasks. If there are no such messages ready to be sent, then the software program proceeds to the "clear schedule flag" function 34. At this function, the software program resets the indicators or signals that indicate to the software program back at the "schedule jobs" decision 32 that there are any jobs which are ready to be scheduled in the first subroutine. This "schedule jobs" flag or signal will then only be activated when the invention 1 has new jobs that are scheduled. After clearing this flag, the software program then exits the first subroutine 30 and continues onto the next or second subroutine, the CAN-controller communication subroutine 50.

If on the other hand at the "messages ready to send" decision 33, the software program detects the presence of CAN messages to be sent by the invention 1, then the program takes a different route in the first or housekeeping subroutine 30 and goes to "set message flag" function 35. After setting the "set message" flag (activating an electronic signal indicating to other functionalities of the software that there are CAN messages present to be scheduled and sent the software program proceeds to the "Reset Timer" function 36 which schedules the order in which the CAN messages should be sent out by the invention 1 over the "smart" wire harness. After this task is completed, the software program then goes to the "set CAN out ready flag" function 37. This flag or signal, when set by the software program, informs other parts of the software program that the outgoing CAN messages are organized and ready to be sent out from the invention 1 over the CAN (J1939) network to corresponding "smart" devices on that network.

At this point, the software program is ready to complete and exit the first or house keeping subroutine 30 by going to the "clear schedule jobs flag" function 34. From the "schedule jobs" decision 32 (if the there were no jobs to be scheduled) or from the "clear schedule jobs flag" function 34 (once first subroutine is completed) the software program then proceeds to the second or CAN-controller communication subroutine 50 where the conversion of signals from the microcontroller 10 to J1939 (or CAN) serial stream messages occur.

At this second subroutine 50, the software programs proceeds to the "CAN message ready" decision 51. At this decision, the software program determines, from the presence of the appropriate flag or signal ("CAN ready" flag), whether the invention 1 has any CAN messages to be sent out. If there are no such CAN messages ready or present, then the software proceeds to the J1939/CAN messages inbox subroutine 70. If CAN messages are ready or present, then the software program enters the second or CAN-controller communication subroutine 50.

If the software program decides at the "CAN message ready" decision 51 to enter the second or CAN-controller communication subroutine 50, it goes to the "CAN buffer to local buffer" function 52. At this level, the software program converts outgoing CAN signals from the microcontroller 10 from the "bit" format that the microcontroller chip uses into the serial stream message or CAN (J1939 in the preferred embodiment) format. The software program then goes to the "set CAN input ready flag" function 53. This function issues a flag or signal indicates, that since outgoing CAN messages are organized, translated and ready to go out, the invention 1 is ready to take in and process incoming or input CAN serial stream messages from various "smart" devices on the CAN network or wire harness.

Once the "set CAN input flag" is set, the software program then proceeds to the "another message" decision 54. At this decision, the software program "double checks" to see (via the appropriate flag) if there are any more outgoing (output CAN messages) ready to be translated. If there are, then the software program then goes back to "CAN buffer to local buffer" function 52 to process and translate any remaining outgoing CAN messages. If there are no more outgoing CAN messages, then the software program goes to "clear CAN ready flag" function 55 wherein the software program essentially resets the flag indicator for the second subroutine and the second subroutine itself after completing all the second subroutine's prescribed tasks. At that point, the software program leaves the second subroutine 50 and proceeds to the third or J1939/CAN messages inbox subroutine 70.

At the third or J1939/CAN messages inbox subroutine 70, the software program proceeds to the "CAN input ready" decision 71. At this decision, the software program determines whether or not the incoming CAN messages are present to be processed by the microcontroller 10. If the software program detects a flag indicating there are incoming CAN messages to be processed, the software program enters the third or J1939/CAN messages inbox subroutine 70 and proceeds to "valid message" decision 72. If the software program does not detect the presence of incoming CAN messages, the software program then bypasses the third or J1939/CAN messages inbox subroutine 70, and proceeds to the fourth or CAN output messages subroutine 90.

If the software program goes into the third subroutine or J1939/CAN messages inbox subroutine 70 it proceeds to the "valid message" decision 72 to see if the incoming CAN message is valid. A CAN or serial stream message will usually have an identifier code embodied in one of its "segments". The microcontroller 10 will have its own personal identifier code to distinguish the message as a receipt from the other "smart" electronic/electrical devices on the CAN or "smart" network. If the incoming CAN message is a valid serial stream message addressed to the microcontroller 10, then the software program will proceed to the "Data to Output Mask" function 73.

If the software program detects that there are no valid CAN messages addressed to the microcontroller 10 (e.g., the CAN message is addressed to another smart device, or it is noise or background interference) the software program goes the "clear CAN in ready flag" function step 74 to reset this third subroutine and cause the program to dump out the invalid incoming CAN message(s).

If the incoming CAN message is valid, the program will proceed to the "data to output mask" function 73 for filtering purposes. At this function, the software program has the incoming CAN message converted from serial stream format into bit format that the microchip of the microcontroller 10 can understand. Once this function is completed, the software program then proceeds to "set control out flag" function 75. After initializing this flag, the software program performs the "clear CAN input ready flag" function 74 which resets and clears this third subroutine for all the previously handled messages that software program had processed.

After completing the "clear CAN input ready flag" function 74, the software program exits the third subroutine, then proceeds to the fourth or CAN output message subroutine 90. In this fourth subroutine, the software program sends out the outgoing CAN messages to the other "smart" devices on the CAN network or "smart" wire harness. The first step of this forth subroutine is "send CAN messages" decision 91 where the software program determines whether there are any outgoing CAN messages previously processed by the earlier subroutines that are ready to go out onto the CAN network "smart" wire harness. If there are none, then the software program bypasses the fourth subroutine and proceeds to the fifth or load output subroutine 110.

If there are outgoing CAN messages ready to go out, then the software program continues into the fourth subroutine 90 to the CAN ready decision 93. Here the software program checks them to see if the microcontroller chip is ready to send out the outgoing CAN messages. If microcontroller chip is not ready, then software program proceeds directly to the "set get inputs flag" function 93 of the fourth subroutine. At the "set get inputs flag" function 93 "notifies" the microcontroller 10 to issue any outgoing CAN messages that it has that are ready to send out.

When microcontroller 10 is ready, the software program moves onto the "which message to send" function 94. In this step, the software program looks at the scheduled outgoing CAN messages and selects the high priority ones. The software program then goes to "send message" function 95 where the software program causes those high priority outgoing CAN messages to be sent out over the CAN network/"smart" wire harness. After completing step 95, the software program proceeds to the "clear message flag" function 96 where the flag signaling that outgoing CAN messages are ready to be sent out is reset. The software program then goes to the "all messages sent" decision 97 to determine if all high priority CAN messages were actually sent out to the CAN/"smart" devices on the CAN/"smart" network. If not all of the high priority CAN messages were sent out, then the software program goes back to "CAN Ready" decision 92. If all of the high priority CAN messages have been sent out, then the program moves to the next step of the fourth subroutine "clear the send CAN flag" function 98. This function resets those steps needed to send out CAN outgoing messages and indicates to other parts of the software program that new high priority outgoing CAN messages can be loaded for outplacement.

After clearing the send CAN flag, the software program then proceeds to the "set get input flag" function 93. After completing this function, the software program then exits the fourth or subroutine the CAN output message subroutine 90.

The software program then continues onto to the fifth or load output subroutine 110. The first decision of the fifth or load output subroutine 110 is the "control out ready" decision 111 whereby the software program checks to see if the microcontroller 10 is ready to send the analog/digital commands to the devices on the motherboard or to the devices that are directly connected to the motherboard (e.g., relay switches which control the analog/digital devices of the vehicle's electrical system). If such commands are not present or ready, the software program then bypasses the fifth or load output subroutine and goes onto the sixth or last subroutine. If such commands are present or ready then the software program goes to the next step of the fifth subroutine, the "open digital latch" function 112.

The "open digital latch" function 112 makes sure that the proper addresses are placed on the commands to insure that the right commands go to the proper devices.

After this function is completed, the software program proceeds to "send output mask to the digital latch" function 113. Here the software program converts the signal from the microcontroller format into a digital signal of sufficient current and voltage as to be recognized by the digital devices and then sends out the signals. The software program proceeds to the final function of this subroutine, "close digital latch" function 114, where the software programs resets the digital latch for receipt from the microcontroller of future outgoing digital signals. After completing this function, the software program exits the fifth subroutine and proceeds to the final or sixth subroutine.

After this function is completed, the software program then proceeds to the sixth and final or output/input verification subroutine 130.

In this final subroutine or output/input verification subroutine 130, the software program proceeds to the input ready decision 131. If there are no digital/analog feedback signals present from the various analog/digital devices of the vehicle, then the software program recycles back to "schedule jobs" decision 32 at the beginning of the first or housekeeping subroutine 30.

If there are no incoming or feedback digital/analog signals present from the various digital/analog devices or sensors then the software program goes on with the or output/input verification subroutine 130. The next step of output/input verification subroutine 130 is the "read analog" function 132, where the software program reads the incoming signals from the analog devices from the electrical system. The software program then provides the translation of the incoming analog signal to a CAN message which can be read by the invention 1 through the previous subroutines of the software program.

After handling the incoming analog signals, the invention 1 then proceeds to the "open digital load latch" step where the software program allows the collection of the incoming feedback digital signals from the digital devices of the vehicle. After completing this step, the software program proceeds to "read digital load latch" function 135. Here the software program begins to processes the collected incoming digital. After completing "read digital load latch" function 135, the software program moves to "close digital load latch" function 136 which stops the reading process of the incoming digital signals clears and resets the digital load latch to receive new incoming digital feedback signals. The software program then completes the final step "digital to CAN message" function 137 of converting feedback digital signals into a CAN message which the microcontroller 10 can understand and process. After the completion of function 137, the final subroutine is completed and the software program recycles back to the "schedule jobs" function 32 step of the first or housekeeping subroutine 30.

Outside of the above-described routine encompassing the six subroutines, the software program has a related "interrupt timer" subroutine 140. The timer interrupt subroutine 140 increases the overall efficiency of the receipt and transmission of the CAN messages but also acts as an automatic reset mechanism should the software program become "stuck" at some point.

The timer interrupt subroutine 140 interrupts the software program every ten milliseconds at the 10 ms interrupt function 141 to check for jobs (i.e. outgoing CAN messages) ordered by the microcontroller 10 at the "timer interrupt" decision 142. If this subroutine finds jobs, it causes the software program to restart at the "schedule jobs" function 31 by setting a set schedule job flag. At that point, the software program reinitiates at its starting point by going into the housekeeping subroutine 30. If there are no incoming CAN messages, then the interrupt subroutine proceeds to "set CAN message flag" function 144 to activate the third subroutine or J1939/CAN messages inbox subroutine 70 is where the invention 1 receives incoming J1939 signals (i.e., serial stream messages) from the vehicle's "smart" electronics located on the "smart" wire harness. Once the incoming and outgoing message steps (housekeeping subroutine 30 and are third subroutine or J1939/CAN messages inbox subroutine 70, respectively) completed the time interrupt subroutine 140 shuts down at the "done" step 145 until another ten milliseconds passes.

Using a smart wire harness that can currently integrate the handling of "dumb" devices with "smart" devices and at the same time replace large sections of the old multiple wire harness with the simplified single wire pair harness will simplify and ease the replacement, repair and maintenance of the current and future vehicles electrical systems, while at the same time enhance their capabilities. Such enhancement could encompass "limp-home" technology, replacement of batteries and alternators combinations with alternative high capacity power sources and storage systems as well as provide for expansion of current electronic systems to incorporate newer technologies as they become available.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. An apparatus for a motor vehicle for at least partial integration and control and monitoring the motor vehicle's electrical system that utilizes includes an ignition and electrical devices that use either analog or digital electrical signals, said apparatus comprises:
   a. a motherboard mounted inside a motor vehicle that uses either analog or digital electrical signals;
   b. a microcontroller with memory connected to said motherboard;
   c. a control area network connector mounted on said motherboard and connected to said microcontroller;
   d. at least one input connector mounted on said motherboard and connected to said microcontroller;
   e. at least one output electrical connector mounted on said motherboard and connected to said microcontroller;
   f. at least one analog connector mounted on said motherboard and connected to said microcontroller;

g. an analog signal conditioner connected to said analog connector and connected to said microcontroller;
h. at least one digital connector mounted on said motherboard and connected to said microcontroller;
i. a power supply input connector mounted on said motherboard and connected to said microcontroller;
j. a load control logic connected to said motherboard and connected to said microcontroller;
k. a load control output connected to load control logic;
l. a plurality of solid state switch relays mounted on said motherboard and connected to said load control logic;
m. a power supply connected to said motherboard;
n. a software program used to convert analog and digital signals from said analog and digital connectors, respectively, into digital signals that can be utilized by said microcontroller, said software program monitors signals received from the motor vehicle's electrical circuits and electric devices delivered to said analog connector and said digital connectors and automatically disconnects an electrical circuit or device when the value of the signal is received is above or below a predetermined value, said software program also able to monitor and control the motor vehicle's electrical circuits and devices after the motor vehicle's ignition as been turned off and then prioritize their importance and selectively control said solid state relays to act as a supplemental power source to provide electrical power to selected electrical circuits and devices thereby enabling them to operate;
o. a circuit programming connector mounted on said motherboard and connected to said microcontroller to enable said microcontroller to be selectively programmed;
p. a physical layer interface mounted on said motherboard and connected to said microcontroller; and
q. a crystal oscillator.

2. The apparatus for electrical management control and monitoring as recited in claim 1, further including a watchdog circuit that monitors the activity of said software program and sends a reboot signal to said microcontroller when said software program is unresponsive.

3. The apparatus for electrical management control and monitoring as recited in claim 1, wherein said motherboard is located in an outer housing.

4. The apparatus for electrical management control and monitoring as recited in claim 1, wherein said control network controller is a SAE J1939 connector.

5. A method of providing at least partial integration and control over a motor vehicle's electrical systems that includes an ignition and electrical and electronic devices which operate on either analog or digital signals, wherein there is a microcontroller whose memory holds at least one software program processing input and output signals from electrical and electronic devices of a vehicle's systems is connected to a motherboard with solid state circuitry for converting input and output signals into a format that the microcontroller can process and with relays for controlling power to various systems of the vehicle, said the method comprising the following steps;
a. coupling an electrical management control and monitoring device that connects to a motor vehicle's electrical system that includes electrical device that use either analog or digital electrical signals, said device includes:
a motherboard;
a microcontroller with memory connected to said motherboard;
a control area network connector mounted on said motherboard and connected to said microcontroller;
at least one input connector mounted on said motherboard and connected to said microcontroller;
at least one output electrical connector mounted on said motherboard and connected to said microcontroller;
at least one analog connector mounted on said motherboard and connected to said microcontroller;
an analog signal conditioner connected to said analog connector and connected to said microcontroller;
at least one digital connector mounted on said motherboard and connected to said microcontroller;
a power supply input connector mounted on said motherboard and connected to said microcontroller;
a load control logic system connected to said motherboard and connected to said microcontroller;
a load control output connected to said load control logic system;
a plurality of solid state switch relays mounted on said motherboard and connected to said load control logic system;
a power supply connected to said motherboard;
a software program used to convert analog and digital signals from said analog and digital connectors, respectively into digital signals that can be utilized by said microcontroller, said software program monitors signals from the motor vehicle's electrical circuits and electric device connected to said analog and digital input connectors and may automatically disconnect a monitored circuit or device when the value of the delivered signal is above or below a predetermined value, said software program also able to monitor and control electrical circuits and devices after the motor vehicle's ignition has been turned off and then prioritizes their importance and selectively control said solid state relays to act as a supplemental power source to provide electrical power to selected electrical circuits and devices thereby enabling said selected electrical circuits and devices to operate;
a circuit programming connector mounted on said motherboard and connected to said microcontroller to enable said microcontroller to be selectively programmed;
a physical layer interface mounted on said motherboard and connected to said microcontroller;
a crystal oscillator;
b. connecting said power supply input connector to an electrical circuit in a motor vehicle;
c. connecting said analog connector to a vehicle's analog sensors, connecting said digital connector to a vehicle digital sensors, connecting said power supply input connector to a vehicle electrical power system, connecting said control network connector to vehicle network interface and connecting said electrical load connectors to a vehicle electrical load;
d. activation of said device;
e. transmitting serial stream signals from said microcontroller thru said control network connector to serial stream signal-based electrical devices in the vehicle;
f. transmitting non-serial stream signals from said microcontroller thru said analog connector, said digital connector, and said electrical load connectors to non-serial stream signal based electrical devices;
g. receiving serial stream signals from serial stream signal-based said electrical devices and non-serial stream signals from non-serial stream signal based electrical devices in said vehicle;
h. determining the status of both serial stream based electrical devices and non-serial stream-based electrical devices for a default behavior using said microcontroller and said software program; and j. producing and transmitting serial stream signals to said serial stream signal based electrical devices and producing and transmitting non-serial stream signals to non-serial stream signal electronic devices when a default behavior event is detected, said signals used to de-active or adjust the operating activity of said electrical devices.

* * * * *